F. M. DOSSOR.
APPARATUS FOR CLEANING AND SEPARATING SEEDS AND GRAIN.
APPLICATION FILED DEC. 2, 1914.
1,154,102. Patented Sept. 21, 1915.
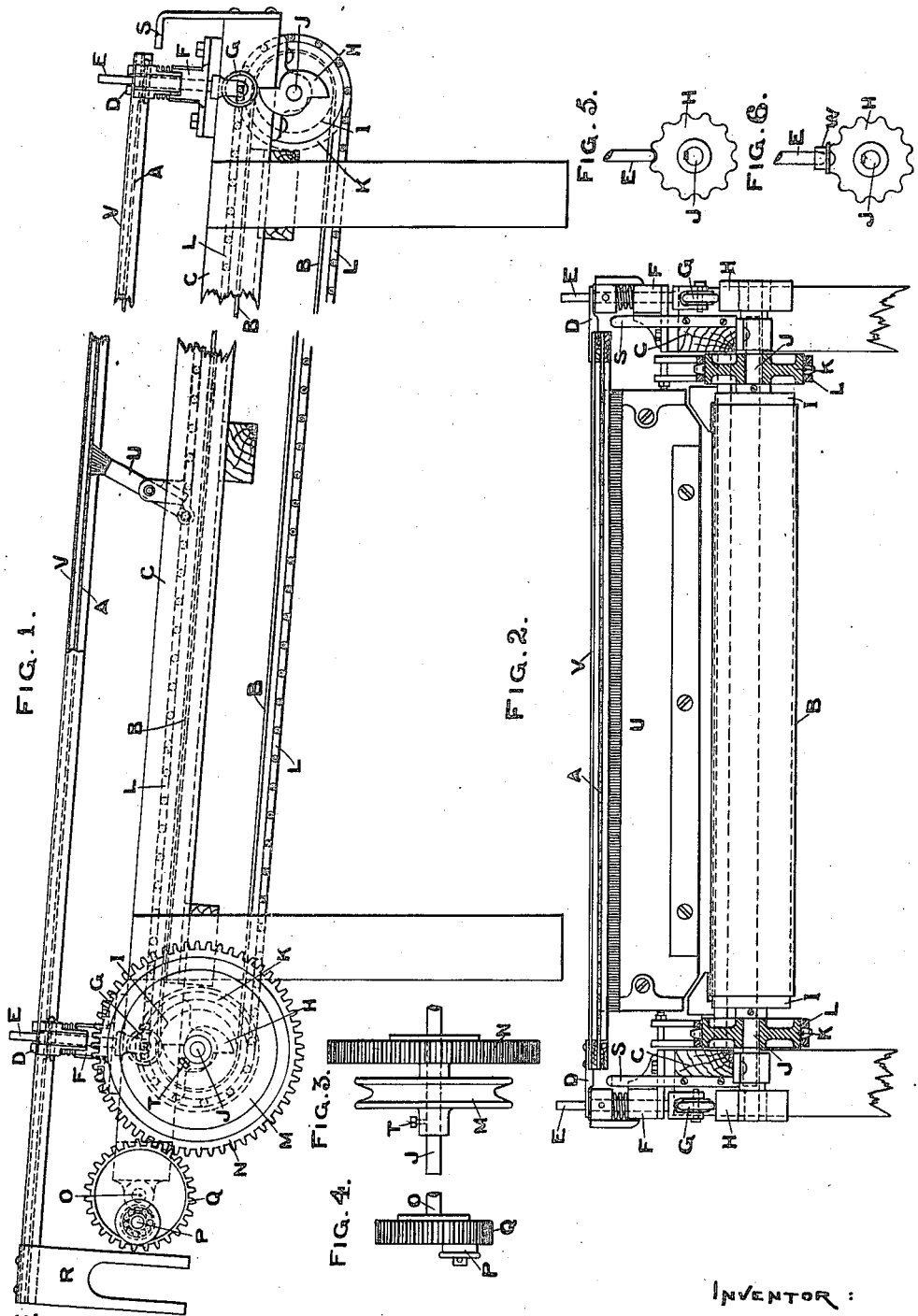

UNITED STATES PATENT OFFICE.

FREDERICK MALCOLM DOSSOR, OF DONCASTER, ENGLAND.

APPARATUS FOR CLEANING AND SEPARATING SEEDS AND GRAIN.

1,154,102.     Specification of Letters Patent.     Patented Sept. 21, 1915.

Application filed December 2, 1914. Serial No. 875,187.

*To all whom it may concern:*

Be it known that I, FREDERICK MALCOLM DOSSOR, a subject of the King of Great Britain and Ireland, residing at Doncaster, in the county of York, England, have invented a new and useful Improvement in Apparatus for Cleaning and Separating Seeds and Grain, of which the following is a specification.

This invention relates to certain improvements in combined sieve and belt apparatus for cleaning and separating seeds and grain.

My invention consists broadly in the construction of an apparatus of this type in which a flat sieve or sieves may be given either an upright jumping or vibratory motion or a longitudinal oscillating motion, whereby different classes of seeds and grain requiring different treatment can be dealt with on a single sieve, the apparatus with these alternative or interchangeable motions of the sieve or sieves being constructed in self-contained sections each complete with sieve clearer, sieve cover, and belt, and being thus applicable either for use as an independent machine, or for use in conjunction with the Dossor seed-dressing machine (Patents Nos. 846915, 866848, and 1028447), or for use in conjunction with any cylinder or blower apparatus employed in any such work of separation.

*Description of the drawings:* Figure 1 is a side elevation (partly in section) of my improved apparatus as arranged with one sieve and belt. Fig. 2 is a front elevation (partly in section) of Fig. 1. Fig. 3 is a side elevation showing arrangement of main driving pulley and wheel. Fig. 4 is a side elevation of secondary driving wheel for the oscillating motion. Figs. 5 and 6 are side elevations of modified forms of the upright jumping or vibrating cam and spindle device.

According to my present invention the flat sieve A and endless belt B are supported on an inclined frame C. The material to be treated is fed evenly to the upper end of the inclined sieve A, either from a hopper or otherwise, and the material passing through the sieve falls on to the belt B, which delivers it into a suitably placed trough or chute, or which if desired may carry it backward and deposit it for further treatment in a similar manner on a second inclined sieve, or a graduated series of such sieves, arranged beneath the first-mentioned sieve A and belt B. The sieve frame has a guide bracket D at or near each corner, fitting on to spring-controlled spindles E supported by fixed brackets F on the main frame C, and each spindle E terminates in a roller G (with renewable tread) bearing upon a cam H, the cams thus imparting an upright jumping motion to the sieve at each corner simultaneously. The belt B is carried at each end by a roller I and shaft J, these shafts J being connected by sprocket wheels K and side chains L, and carrying also the cams H. The shaft J at the upper end of the machine carries also the driving pulley M, which is slidable and carries a spur wheel N hereinafter referred to.

The upright jumping motion of the sieve as hereinbefore described may be readily converted into a longitudinal oscillating motion. For this purpose a countershaft O is mounted at the upper end of the frame C, this countershaft having a ball-bearing crank P at each end, driven by a spur wheel Q engaging with the aforesaid wheel N. The sieve frame is fitted at its upper end with forked side arms R adapted to engage with the ball-bearing cranks P, and the lower end of the main frame C is provided with side guide rods S. The sieve frame is lifted off the spring-controlled jumping spindles E, and is replaced with its forked arms R in engagement with the cranks P, and with the guide brackets D at its lower end resting slidably upon the guide rods S, so that by this means a backward and forward oscillating motion is imparted to the sieve, which motion can be varied according to requirements by varying the stroke of the cranks P. The spindles E, when relieved of the weight of the sieve, are at once automatically lifted clear of the cams H. The countershaft O may be thrown out of gear at will by simply slackening the screw T and sliding the pulley M and wheel N along the upper shaft J, or this may be effected in any other convenient manner, as for instance by mounting the countershaft O in movable bearings.

The side chains L of the belt carry automatic sieve clearers U (either brush, roller, or rubber), which are pivoted and weighted so as to bear continuously and at a suitable angle upon the underside of the sieve A.

In order to keep the material longer on the sieve A when the jumping motion is in use, a lid or cover V is provided in suitable proximity to the sieve, the effect being that the material, when thrown upward and forward from the inclined sieve A, comes in contact with the cover V and falls vertically, its forward motion down the sieve A being thus retarded so that it is brought more frequently into contact with the sieving surface than would be the case if its downward progress were unchecked. The material retained by the sieve A is delivered at the lower end into a suitable trough or chute.

Where a slighter jumping motion of greater frequency is required, approximating to an up-and-down vibratory motion, the cam H (Fig. 5) is made in an indented circular form with a comparatively large number of shallow rounded teeth, operating direct on the end of the spindle E or on a small renewable thimble fitted thereon. In case a still slighter jumping or vibratory motion should be required, the spindle E may be fitted with a detachable reducing shoe W (Fig. 6) of sufficient width to span two adjacent cam teeth. This type of indented circular cam is operative in either direction, and thus enables the belt B to be driven in either direction, for delivery of the treated material either at the back of the machine (for further treatment on a lower sieve or sieves) or in front of the machine (for removal after the first treatment).

I claim:

1. A seed and grain separator comprising, in combination, a flat inclined sieve, an endless traveling belt mounted beneath the sieve and adapted to receive and deliver the material passing through the sieve, and a common selective means whereby the sieve may be given either an upright jumping motion or a longitudinal oscillating motion, so that different classes of seeds and grain requiring different treatment can be dealt with on a single sieve, substantially as herein set forth.

2. A seed and grain separator comprising, in combination, a flat inclined sieve, an endless traveling belt mounted beneath the sieve and adapted to receive and deliver the material passing through the sieve, a common selective means whereby the sieve may be given either an upright jumping motion or a longitudinal oscillating motion, so that different classes of seeds and grain requiring different treatment can be dealt with on a single sieve, and a lid or cover in close proximity to the sieve for the purpose of checking the downward progress of the material on the sieve and thereby keeping the material longer on the sieve and bringing it into more frequent contact with the sieve to insure effective separation substantially as herein set forth.

3. A seed and grain separator comprising, in combination, a flat inclined sieve, an endless traveling belt mounted beneath the sieve and adapted to receive and deliver the material passing through the sieve, a common selective means whereby the sieve may be given either an upright jumping motion or a longitudinal oscillating motion, so that different classes of seeds and grain requiring different treatment can be dealt with on a single sieve, a lid or cover in close proximity to the sieve for the purpose of checking the downward progress of the material on the sieve and thereby keeping the material longer on the sieve and bringing it into more frequent contact with the sieve to insure effective separation, and the pivoted and weighted automatic sieve clearer or clearers carried by the belt chains and operating on the under or non-working face of the sieve, substantially as herein set forth.

4. The combination with a sieve, of means for imparting a jumping or vibratory motion comprising cams, spring controlled spindles actuated thereby, and a detachable reducing shoe adapted to vary the jumping or vibratory motion of the same.

5. The combination with a sieve, of means for giving the same a longitudinal oscillating motion comprising a shaft, a counter-shaft, a pulley and wheel on the shaft, cranks, a spur wheel on the counter-shaft, supporting the crank, and a forked arm on the frame adapted to engage with the crank.

FREDERICK MALCOLM DOSSOR.

Witnesses:
JOHN E. WALSH,
ALLAN BENNETT.